US008175980B2

(12) United States Patent
Lee et al.

(10) Patent No.: US 8,175,980 B2
(45) Date of Patent: May 8, 2012

(54) HOT VIDEO PREDICTION SYSTEM BASED ON USER INTERESTS SOCIAL NETWORK

(75) Inventors: Hahn-Ming Lee, Taipei (TW); Hui-Ju Cheng, Taipei (TW); Ching-Hao Mao, Taipei (TW); Chao-Wen Li, Taipei (TW); Shou-Wei Ho, Taipei (TW); Jerome Yeh, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 296 days.

(21) Appl. No.: 12/612,436

(22) Filed: Nov. 4, 2009

(65) Prior Publication Data

US 2010/0319031 A1   Dec. 16, 2010

(30) Foreign Application Priority Data

Jun. 12, 2009  (TW) ................................ 98119681 A

(51) Int. Cl.
*G06Q 99/00* (2006.01)
*G06Q 10/00* (2012.01)

(52) U.S. Cl. ........................................ 705/319; 705/1.1

(58) Field of Classification Search .................. None
See application file for complete search history.

(56) References Cited

U.S. PATENT DOCUMENTS

| 2002/0120501 A1* | 8/2002 | Bell et al. ................. 705/14 |
| 2010/0050098 A1* | 2/2010 | Turner ....................... 715/763 |
| 2010/0121682 A1* | 5/2010 | Abboa-Offei ............. 705/10 |

\* cited by examiner

*Primary Examiner* — Jonathan Ouellette

(57) ABSTRACT

A hot video prediction system is provided. A video comments database stores video comments submitted by a plurality of users. A user social network constructor establishes a user social network according to the video comments. When new comments of a new video are received, a hot video predictor uses the user social network to determine a similar theme between the new video and hot videos that have been hot for a period of time, and predicts whether the new video will become popular accordingly. A social network adaptor checks the prediction, and modifies the user social network accordingly.

18 Claims, 5 Drawing Sheets

HOT VIDEO PREDICTION SYSTEM BASED ON USER INTERESTS SOCIAL NETWORK

BACKGROUND

The invention relates to online content analysis, and in particular to hot video prediction systems and methods based on a user's social network.

This section is intended to introduce the reader to various aspects of the art, which may be related to various aspects of the present invention, which are described and/or claimed below. This discussion is believed to be helpful in providing the reader with background information to facilitate a better understanding of the various aspects of the present invention. Accordingly, it should be understood that these statements are to be read given said understanding, and not as admissions of prior art.

Conventionally, predicting popular content, such as online news and blogs, is performed by calculating similarity of context vectors to cluster contents corresponding to similar topics.

The conventional method, however, cannot effectively analyze video data which is constantly being updated and lacks context contents. Thus, it is difficult to predict hot videos by clustering videos based on context. First, context is not always contained in a video. Second, popularity of videos corresponding to the same theme might be completely different.

Accordingly, an effective hot video prediction method is needed.

SUMMARY

Certain aspects commensurate in scope with the claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

A hot video prediction system is provided. A video comments database stores a plurality of video comments submitted by a plurality of users. A user social network constructor establishes a user social network of the users according to the video comments. A hot video predictor, upon receiving a new comment of a new video, determines a similar theme between the new video and hot videos that have been popular for a period of time according to the user social network, and predicts whether the new video is going to be popular accordingly. A social network adaptor verifies the prediction, and modifies the user social network accordingly.

A hot video prediction method is provided. The method comprises steps of: providing a plurality of video comments submitted by a plurality of users during a period of time in the past; establishing a user social network of the users according to the video comments; upon receiving a new comment of a new video, determining a similar theme between the new video and hot videos that have been popular for the period of time according to the user social network, and predicting whether the new video is going to be popular accordingly; and verifying the prediction, and modifying the user social network accordingly.

A computer readable storage medium for storing a computer program providing a hot video prediction method is provided, comprising: providing a plurality of video comments submitted by a plurality of users during a period of time in the past; establishing a user social network of the users according to the video comments; upon receiving a new comment of a new video, determining a similar theme between the new video and hot videos that have been popular for the period of time according to the user social network, and predicting whether the new video is going to be popular accordingly; and verifying the prediction, and modifying the user social network accordingly.

BRIEF DESCRIPTION OF DRAWINGS

The invention can be more fully understood by reading the subsequent detailed description and examples with references made to the accompanying drawings, wherein.

DETAILED DESCRIPTION

One or more specific embodiments of the invention are described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacturing for those with ordinary skill of the art having the benefit of this disclosure.

In the following detailed description, reference is made to the accompanying drawings which form a part hereof, shown by way of illustration of specific embodiments. These embodiments are described in sufficient detail to enable those skilled in the art to practice the invention, and it is to be understood that other embodiments may be utilized and that structural, logical and electrical changes may be made without departing from the spirit and scope of the present invention. The following detailed description is, therefore, not to be taken in a limiting sense. The leading digit(s) of reference numbers appearing in the figures corresponds to the Figure number, with the exception that the same reference number is used throughout to refer to an identical component which appears in multiple Figures. It should be understood that many of the elements described and illustrated throughout the specification are functional in nature and may be embodied in one or more physical entities or may take other forms beyond those described or depicted.

Figure 1:
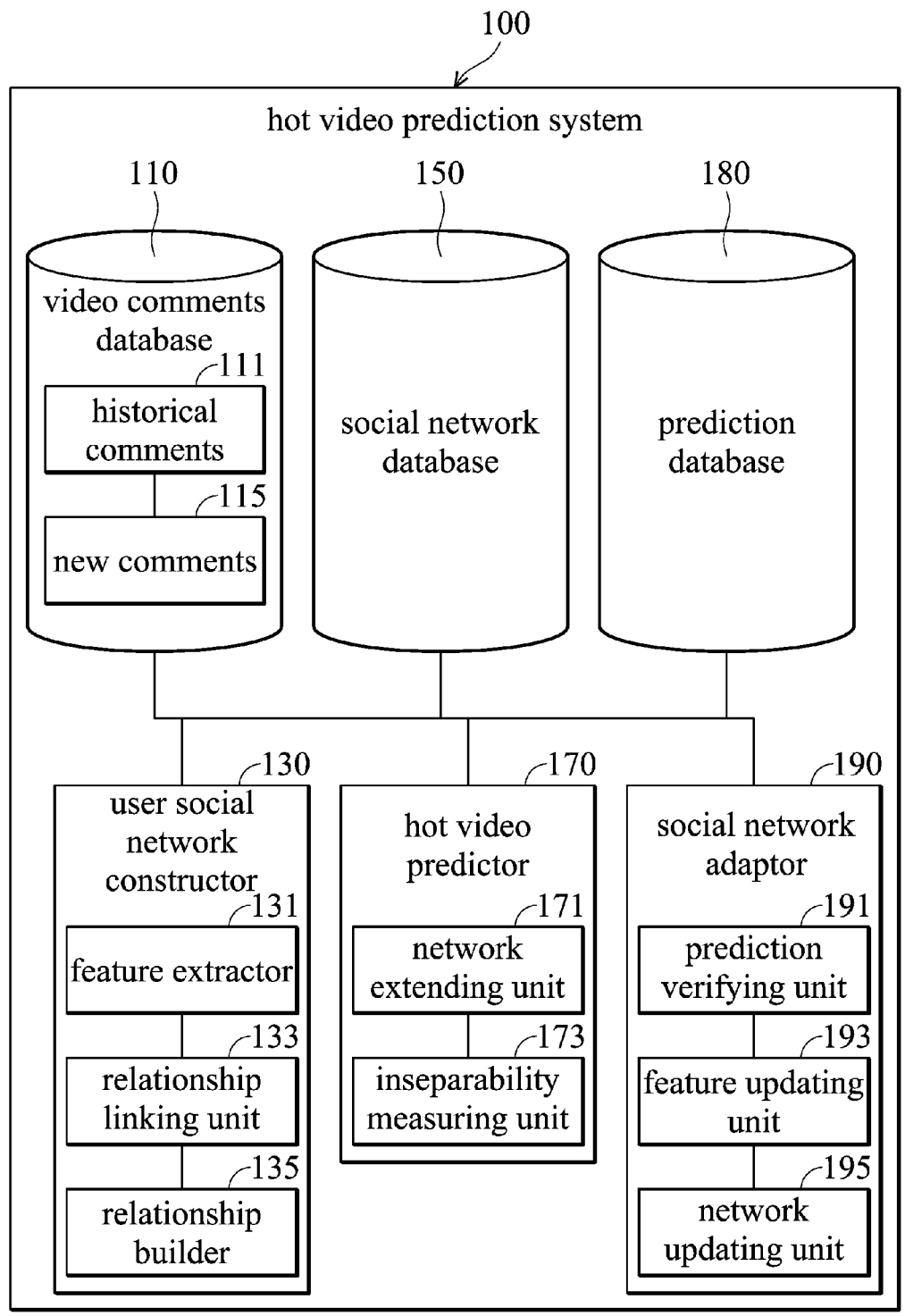
FIG. 1 is a schematic view of an embodiment of a hot video prediction system.

FIG. 1 is a schematic view of an embodiment of a hot video prediction system.

As shown in FIG. 1, hot video prediction system 100 comprises: a video comments database 110, a user social network constructor 130, a social network database 150, a hot video predictor 170, a prediction database 180 and a social network adaptor 190.

The video comments database 110 stories a plurality of video comments. Based on input time for each of the video comments, these video comments can be divided into historical comments 111 and new comments 115. The historical comments 111 are video comments submitted by users during a period of time in the past, and are used to establish an initial user social network. The new comments 115 are video comments input by users recently, and are used to update the user social network and to predict hot videos.

The user social network constructor 130 comprises: a feature extractor 131, a relationship linking unit 133 and a relationship builder 135.

The feature extractor 131 extracts user interest features for each of the users according to the historical comments 111 stored in the video comments database 110. The relationship linking unit 133 establishes relationships between a pair of the users according to the user interest features obtained by the feature extractor 131. The relationship builder 135 determines common interests among the users according to the relationship between a pair of users obtained by the relationship linking unit 133, and establishes an initial user social network accordingly.

The social network database 150 stores the initial user social network generated by the user social network constructor 130.

The hot video predictor 170 comprises a network extending unit 171 and an inseparability measuring unit 173.

The network extending unit 171 searches, based on the user social network, for other users having common interests related to the users providing the new comments (i.e., the new comments 115) to establish the user social network corresponding to the new comments.

The inseparability measuring unit 173 determines the similarity among users corresponding to the new comments according to inseparability of the user social network corresponding to the new comments, and predicts whether the new video is going to be popular accordingly. When the inseparability of the user social network increases, the similarity among users becomes higher accordingly. Here, the inseparability of the user social network corresponding to the new comments is determined using a K-Core algorithm, wherein a high K value indicates a high inseparability of the user social network. A particular video is predicted to be popular when the corresponding K value exceeds a preset value. If the particular video is predicted to be popular, then a title of the video is loaded into a hot video list.

The prediction database 180 stores the prediction result obtained by the hot video predictor 170, wherein the prediction result is a hot video list comprising: a hot video title, a user name, and a similar theme thereof.

The social network adaptor 190 verifies the prediction result, and modifies the user social network stored in the social network database 150 accordingly. The social network adaptor 190 comprises: a prediction verifying unit 191, a feature updating unit 193 and a network updating unit 195.

The prediction verifying unit 191 retrieves data from the prediction database 180, and determines whether the prediction result is correct according to browsed times of the new video.

The feature updating unit 193 adds new user interest features and updates the user interest feature according to the result obtained by the prediction verifying unit 191.

The network updating unit 195 updates the user social network by pruning irrelevant common interests from the user social network according to the updated user interest features, and stores the updated user social network into the social network database 150.

Figure 2:
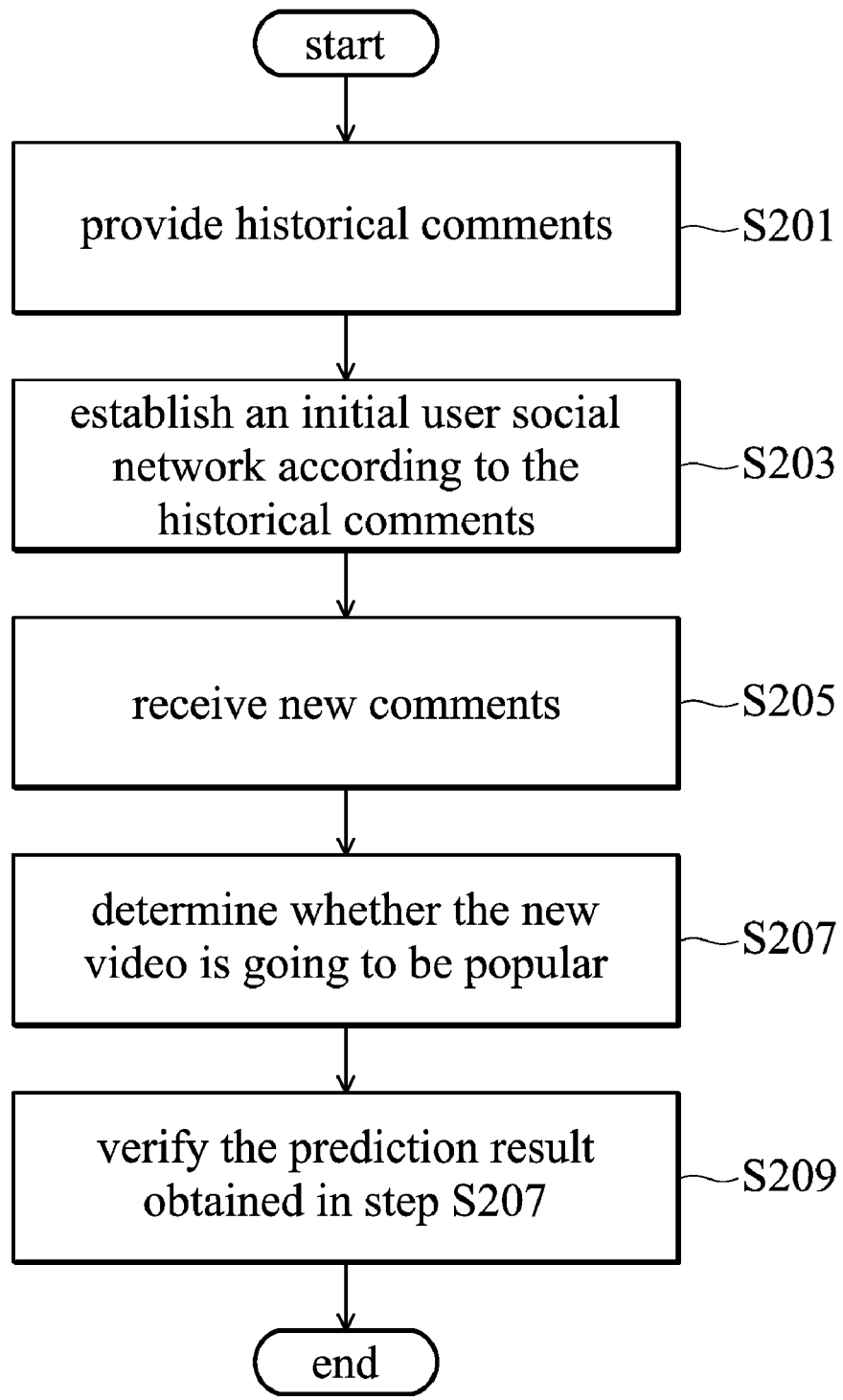
FIG. 2 is a flowchart of an embodiment of a hot video prediction method.

FIG. 2 is a flowchart of an embodiment of a hot video prediction method.

In step S201, video comments (historical comments) are provided, wherein the historical comments were submitted by users during a period of time in the past. In step S203, an initial user social network is established according to the historical comments. In step S205, newly input video comments are received (hereinafter referred to as new comments). In step S207, based on the similarity between interests of users corresponding to the new video and recently-popular videos, it is determined whether a theme of a new video is related to videos that have been recently popular, and it is determined whether the new video is going to be popular accordingly. For example, if both of user 'A' and user 'B' have submitted comments directed to a particular video, then relationship between the pair of the users (user 'A' and user 'B') is determined. In step S209, the prediction result obtained in step S207 is verified, and the user social network is updated accordingly.

Figure 3:
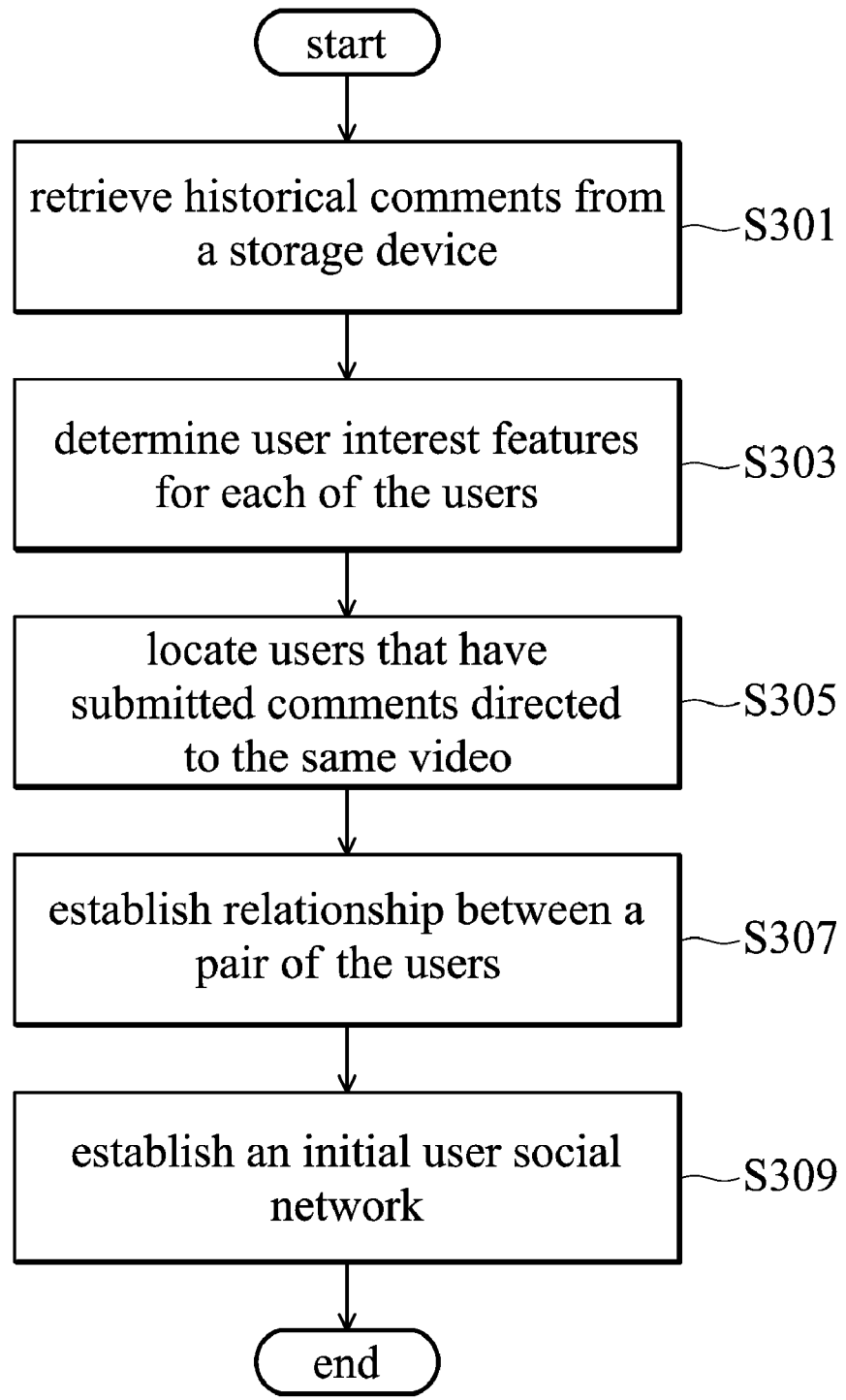
FIG. 3 is a flowchart of the step of establishing a user social network in the FIG. 2.

FIG. 3 is a flowchart of the step of establishing a user social network in the FIG. 2.

In step S301, historical comments are retrieved from a storage device. In step S303, user interest features for each of the users are determined according to the historical comments. The user interest feature can be represented by a behavior feature such as a behavior of 'submitting comments directed to a video'. In step S305, users that have submitted comments directed to the same video are located. In step S307, relationship between a pair of the users is established according to the user interest features. In step S309, an initial user social network is established according to the relationship.

Figure 4:
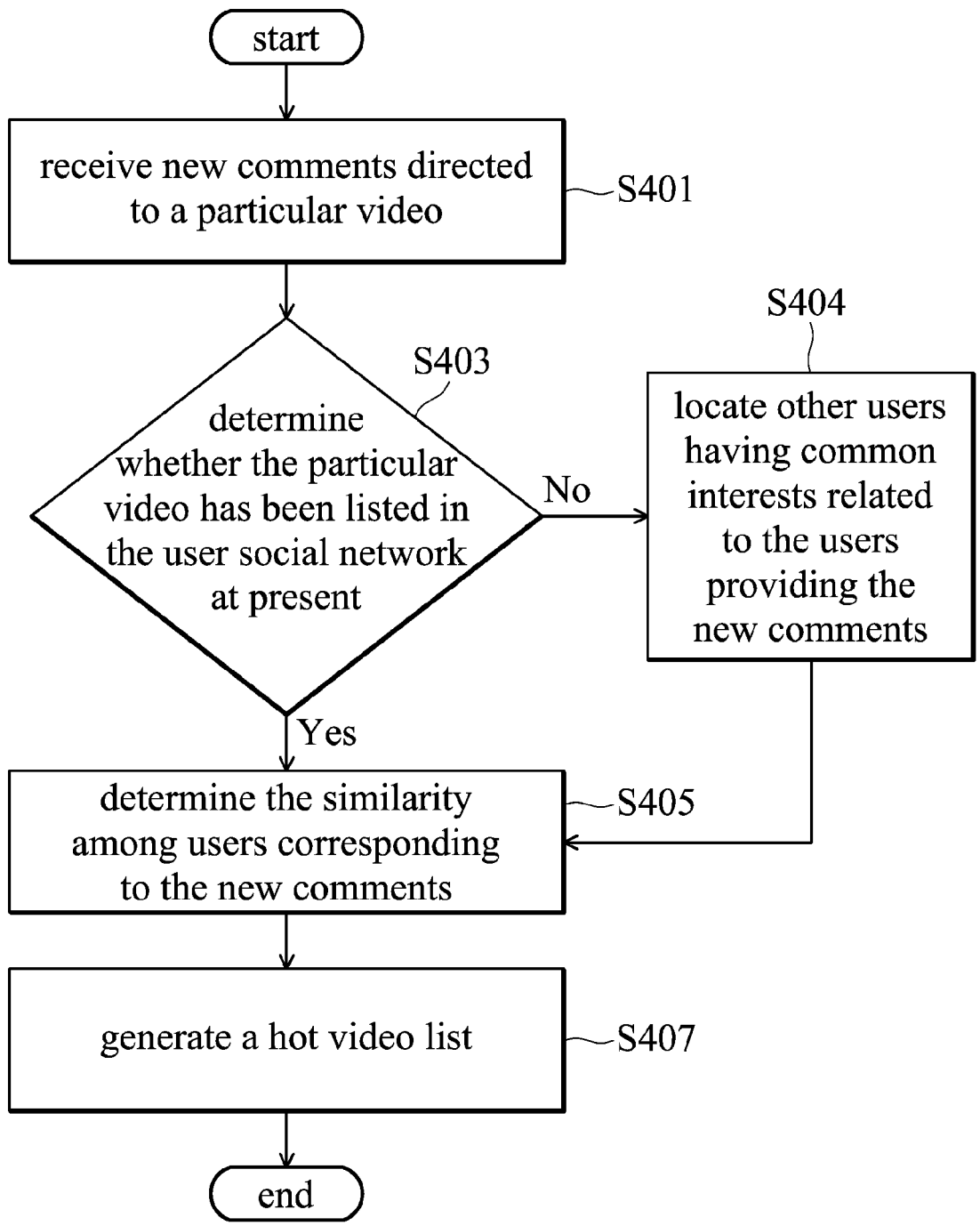
FIG. 4 is a flowchart of the step of predicting hot videos in the FIG. 2.

FIG. 4 is a flowchart of the step of predicting hot videos in the FIG. 2.

In step S401, new comments directed to a particular video (i.e., the new comments) are received. In step S403, it is determined whether the particular video has been listed in the user social network at present, and if so, the method proceeds to step S405, otherwise, the method proceeds to step S404. In step S404, other users having common interests related to the users providing the new comments (i.e., the new comments 115) are located based on the user social network, in order to establish the user social network corresponding to the new comments. In step S405, the similarity among users corresponding to the new comments is determined according to inseparability of the user social network corresponding to the new comments, and then it is determined whether the new video is going to be popular accordingly. When the inseparability of the user social network increases, the similarity among users becomes higher accordingly. Here, the inseparability of the user social network corresponding to the new comments is determined using a K-Core algorithm, wherein a high K value indicates a high inseparability of the user social network. A particular video is predicted to be popular when the corresponding K value exceeds a preset value. In step S407, a hot video list is generated. Here, when the particular video is predicted to be popular, a title of the video is loaded into a hot video list.

Figure 5:
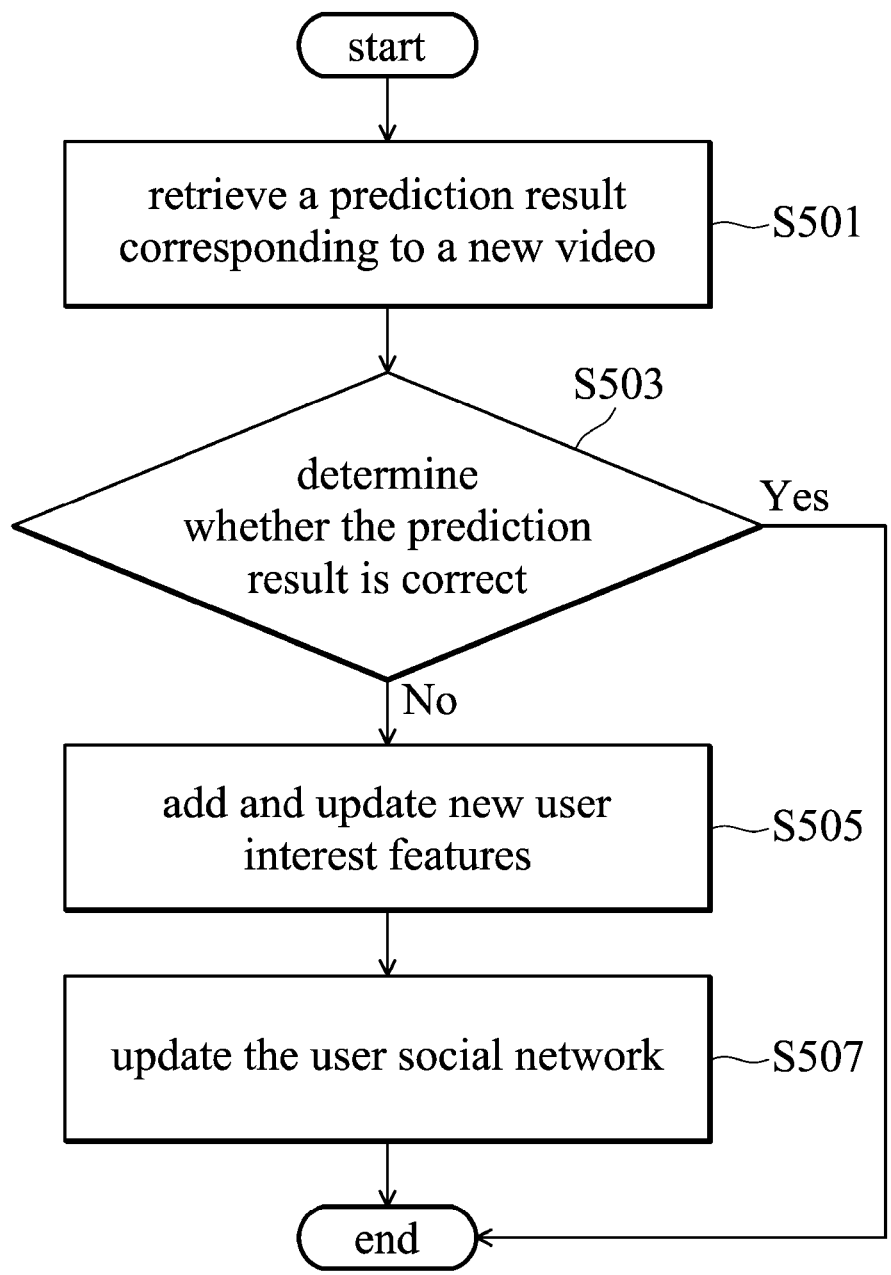
FIG. 5 is a flowchart of the step of verifying and modifying the user social network in the FIG. 2.

FIG. 5 is a flowchart of the step of verifying and modifying the user social network in the FIG. 2.

In step S501, a prediction result corresponding to a new video is retrieved. For example, the prediction result corresponding to a particular new video is generated a few days ago. In step S503, it is determined whether the prediction result is correct according to browsed times of the new video. For example, the new video has been browsed for X times. When the X value exceeds a preset value, then the corresponding new video is recognized as a hot video. In step S505, new user interest features are added and the user interest features are updated according to the result obtained in step S503. In step S507, the user social network is updated by pruning irrelevant common interests from the user social network according to the updated user interest features, and the updated user social network is stored in a social network database.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A hot video prediction system, comprising:
   a video comments database storing a plurality of video comments submitted by a plurality of users;
   a user social network constructor establishing a user social network of the users according to the video comments;
   a hot video predictor, upon receiving a new comment of a new video, determining a similar theme between the new video comment content and comment content of hot videos that have been popular for a period of time according to the user social network, and predicting whether the new video is going to be popular accordingly;
   a social network adaptor verifying a result of the prediction, and modifying the user social network accordingly.

2. The hot video prediction system of claim 1, wherein the user social network constructor comprises:
   a feature extractor determining user interest features for each of the users according to the video comments;
   a relationship linking unit establishing a relationship between a pair of the users according to the user interest features; and
   a relationship builder determining common interests among the users according to the relationship between a pair of users, and establishing the user social network accordingly.

3. The hot video prediction system of claim 1, wherein the hot video predictor comprises:
   a network extending unit, searching, based on the user social network, for other users having common interests related to the users providing the new comment to establish the user social network corresponding to the new comment; and
   an inseparability measuring unit, determining the similarity among users corresponding to the new comment according to inseparability of the user social network corresponding to the new comment, and predicting whether the new video is going to be popular accordingly.

4. The hot video prediction system of claim 1, wherein the social network adaptor comprises:
   a prediction verifying unit, determining whether the prediction result is correct according to browsed times of the new video;
   a feature updating unit, updating user interest features according to the result obtained by the prediction verifying unit; and
   a network updating unit, updating the user social network by pruning irrelevant common interests from the user social network according to the updated user interest features.

5. The hot video prediction system of claim 1, further comprising a social network database for storing the user social network generated by the user social network constructor.

6. The hot video prediction system of claim 1, further comprising a prediction database for storing the prediction result obtained by the hot video predictor, wherein the prediction result is a hot video list comprising a hot video title, a user name, and similar theme thereof.

7. A hot video prediction method, comprising:
   storing, by a video comments database, a plurality of video comments submitted by a plurality of users during a period of time in the past;
   establishing, by a user social network constructor, a user social network of the users according to the video comments;
   upon receiving a new comment of a new video, determining, by a hot video predictor, a similar theme between the new video comment content and comment content of hot videos that have been popular for the period of time according to the user social network, and predicting whether the new video is going to be popular accordingly; and
   verifying, the prediction by a social network adaptor, and modifying the user social network by the social network adaptor accordingly.

8. The hot video prediction method of claim 7, wherein the step of establishing the user social network comprises:
   determining user interest features for each of the users according to the video comments; and
   establishing a relationship between a pair of the users according to the user interest features; and
   determining common interests among the users according to the relationship between a pair of users, and establishing the user social network accordingly.

9. The hot video prediction method of claim 7, wherein the step of predicting hot video comprises:
   searching, based on the user social network, for other users having common interests related to the users providing the new comment to establish the user social network corresponding to the new comment;
   determining the similarity among users corresponding to the new comment according to inseparability of the user social network corresponding to the new comment, and predicting whether the new video is going to be popular accordingly.

10. The hot video prediction method of claim 7, wherein the step of updating the social network comprises:
    determining whether the prediction result is correct according to browsed times of the new video;
    updating user interest features according to the result obtained by the prediction verifying unit;
    updating the user social network by pruning irrelevant common interests from the user social network according to the updated user interest features.

11. The hot video prediction method of claim 7, further providing a social network database for storing the user social network generated by the user social network constructor.

12. The hot video prediction method of claim 7, further providing a prediction database for storing the prediction result obtained by the hot video predictor, wherein the prediction result is a hot video list comprising a hot video title, a user name, and a similar theme thereof.

13. A computer readable storage medium for storing a computer program providing a hot video prediction method, wherein the method comprises:

providing a plurality of video comments submitted by a plurality of users during a period of time in the past;

establishing a user social network of the users according to the video comments;

upon receiving a new comment of a new video, determining a similar theme between the new video comment content and comment content of hot videos have been popular for the period of time according to the user social network, and predicting whether the new video is going to be popular accordingly; and verifying the prediction, and modifying the user social network accordingly.

14. The computer readable storage medium of claim 13, wherein the step of establishing the user social network comprises:

determining user interest features for each of the users according to the video comments;

establishing a relationship between a pair of the users according to the user interest features; and determining common interests among the users according to the relationship between a pair of users, and establishing the user social network accordingly.

15. The computer readable storage medium of claim 13, wherein the step of predicting hot video comprises:

searching, based on the user social network, for other users having common interests related to the users providing the new comment to establish the user social network corresponding to the new comment;

determining the similarity among users corresponding to the new comment according to inseparability of the user social network corresponding to the new comment, and predicting whether the new video is going to be popular accordingly.

16. The computer readable storage medium of claim 13, wherein the step of updating the social network comprises:

determining whether the prediction result is correct according to browsed times of the new video;

updating user interest features according to the result obtained by the prediction verifying unit;

updating the user social network by pruning irrelevant common interests from the user social network according to the updated user interest features.

17. The computer readable storage medium of claim 13, wherein the method further provides a social network database for storing the user social network generated by the user social network constructor.

18. The computer readable storage medium of claim 13, wherein the method further provides a prediction database for storing the prediction result obtained by the hot video predictor, wherein the prediction result is a hot video list comprising a hot video title, a user name, and a similar theme thereof.

* * * * *